Patented Apr. 15, 1952

2,593,334

UNITED STATES PATENT OFFICE 2,593,334

BEARING STRUCTURE FOR SPINNING AND TWISTING SPINDLES

Werner Naegeli, Winterthur, Switzerland, assignor to Actiengesellschaft Joh. Jacob Rieter & Cie., Winterthur, Switzerland Application August 29, 1947, Serial No. 771,357
In Switzerland September 23, 1946

4 Claims. (Cl. 308—152)

My present invention relates to improvements in the bearing arrangement for spinning and twisting spindles, in which a spindle bush provided with the spindle bolster is mounted laterally oscillatable, relative to the spindle holder, by employing a fluid damping arrangement. The main object of my invention is to afford means for damping the lateral oscillations of the spindle, while permitting a vertical oscillation thereof.

An exact study of dynamic compensation of overweights on spindles, shows that an unbalance present in the yarn is compensated most expediently by a translatory movement of the spindle parallel to its axis. In the case of such dynamic compensation of unbalance by means of the movement of the center of gravity of the spindle parallel to its axis, the tip of the spindle is much less deflected than in the case when said unbalance is compensated in the usual way by a rotary motion of the spindle. For this reason, the spindle bush, contrary to the usual executional forms, has to be supported with sufficient lateral clearance also at the bolster.

Attempts have already been made to support the spindle bush to move laterally in the head of the spindle holder by using simple means of liquid damping. In this case it has been found troublesome that the foot-step and bolster of spindles, when spinning long and heavy cops for example, have to be arranged at a relatively, considerable distance from one another.

An overweight present in the yarn package, causes under running conditions a considerable tipping moment, which has to be compensated by the two bearings without stressing the spindle shank over the admissible limit. The considerable distance between the two bearings and the small clearance between spindle bush and spindle holder, as it is necessary for an effective liquid damping, unfavorably influence the flexibility of the spindle; for this reason the spindle can give way but insufficiently when passing through critical speeds. Should the clearance between the head of the spindle bush and the spindle holder be increased in order to provide a greater flexibility of the spindle, the liquid used for damping becomes less efficient; the spindle easily starts to whirl under the influence of the overweights present in the yarn.

Thus, the mentioned flexibility and damping are completely opposed requirements with respect to the spindle. Furthermore, as the bearing lubricating oil, which has also to carry out the function of the damping medium, is of low viscosity, this again necessitates, in order to produce the damping action, a smaller clearance between the spindle bush and spindle holder, but which is not sufficient for the required flexibility of the spindle.

An object of this invention is to provide additional liquid damping between the spindle-bush bolster and the outer annular wall of the spindle holder, such liquid damping providing satisfactory damping action with a practically sufficient lateral clearance between spindle bush and spindle holder. For this purpose, the space between spindle-bush bolster and the annular wall of the spindle holder is subdivided into a plurality of concentric liquid layers. Advantageous means for obtaining this is the arrangement of a single hollow cylinder with lateral clearance between the spindle holder and the spindle-bush bolster, or still better of several concentric hollow cylinders, between which lateral clearance is also provided.

Other objects of the invention relating particularly to details of construction will become apparent from the following description read in conjunction with the drawing, showing by way of example the sectional elevation of one executional form of the bearing according to the invention.

Figure 2:
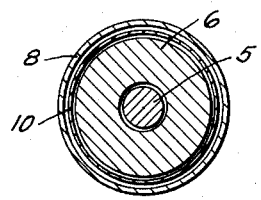
Figures 2, 3 and 4 are horizontal sectional views on the line A—A representing different types of lubricating devices.

In the spindle holder 1 is arranged the spindle bush 2 with the footstep 3 and the bolster 4, for guiding the shank 5' of spindle 5. The top collar 6 of spindle bush 2 rests on the shoulder 7 of holder 1. The sleeve 10 is arranged with lateral clearance, i. e. free to move between the upper annular wall 8 and the inside shoulder 7 of holder 1, forming an annular chamber 9, the narrowed top extension of which is limited on the inside by the collar 6 of spindle bush 2. In order to prevent sleeve 10 from being lifted through vibrations, it possesses a lug 11 engaging a bore 12 of the annular wall 8, thus preventing sleeve 10 from carrying out a vertical movement.

Spindle holder 1 and the spindle bush 2 are filled with oil approximately up to half of their height. When the spindle is running, the oil creeps upwards along the conically thickened spindle shank 5', in the shape of a thin oil film and also lubricates bolster 4. The oil flows over the top face of the collar 6 of spindle bush 2 into the mentioned annular chamber 9, where it forms cushions preventing a contact of the sleeve 10 on the one hand with the collar 6 of spindle bush 2, and on the other hand with the annular wall 8 of spindle holder 1. The widened lower portion of the annular chamber 9 serves as oil reservoir, from which the oil flows back throttled through the opening 13 provided on the inner shoulder 7 of spindle holder 1 to the annular space constituted between the spindle holder 1 and the spindle bush 2, where eventual impurities carried by the oil are deposited. The holes 14 at the lower extremity of spindle bush 2 provide a connection between the footstep 3 and the bottom space of spindle holder 1 and also a connection with the annular space mentioned, enabling the circulation of the oil.

A double cushioning is thus provided for spindle bush 2 in the region of its collar 6 through the circulating oil, causing the dampening of the lateral movement of spindle bush 2 and producing a smooth running of the spindle. In addition, this spindle bearing is characterized by a particularly high working safety and long life. This is mainly due to the additional oil storage space formed by the widened annular chamber 9 in the head of spindle holder 1, from which the damping surfaces formed inside and outside on the sleeve 10 are always supplied through capillary action with sufficient oil or damping liquid, in such a manner that when starting the spindle after a standstill for a considerable time, the transition of the critical speed is effected vibrationless and without stressing abnormally the spindle and the bearings. It is, of course, possible under certain conditions, to eventually increase the number of damping liquid layers by adding further hollow cylinders or by arranging a band wound in the shape of a spiral, particularly a spiral spring. The shape of all the parts required for the spindle bearing described, is so simple that they are suitable for cheap mass-production.

In Fig. 2 the oil cushion 10 is in the form of a cylindrical sleeve.

Figure 3:
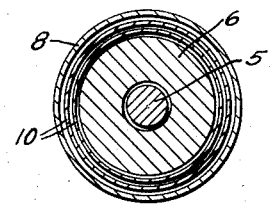

In Fig. 3 the oil cushion 10 is in the form of a pair of telescoped cylindrical sleeves.

Figure 4:
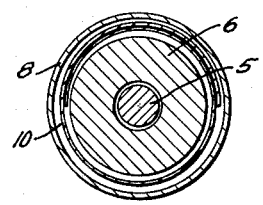
Figure 1:
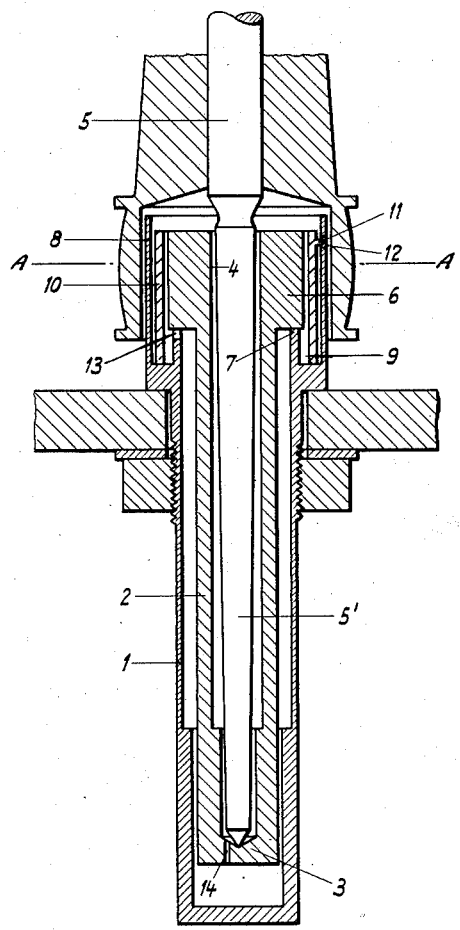
Figure 1 is a vertical sectional view of a bearing arrangement for spindles according to this invention, with a lubricating means indicated diagrammatically.

In Fig. 4 the oil cushion 10 is in the form of a spiral sheet.

It will be obvious that various changes may be made, by those skilled in the art, in the details of the embodiment of the invention illustrated in the drawing and described above, within the principles and the scope of the invention as expressed in the appending claims.

What I claim is:

1. A bearing for spinning and twisting spindles, comprising a spindle holder forming a housing at its upper end, said housing having an outer cylindrical wall extending coaxially with the spindle axis, and an inner coaxial cylindrical wall of shorter height than the outer wall, said two walls forming an annular chamber between them, a spindle sleeve in said holder and provided with a central bore into which the spindle extends in operation, the lower portion of said bore being of a size that only a small amount of play is present between the spindle and the lower portion of said sleeve, a collar formed on the upper end of the spindle sleeve, said collar being lodged within said housing and supported on the upper edge of said inner cylindrical wall of the housing, and a multiple fluid flow damping means interposed between said collar and the outer cylindrical wall of said housing and supported on the bottom of said annular chamber between the inner and outer wall of the housing.

2. A spindle bearing according to claim 1, in which the fluid flow damping means is a hollow cylinder, the outer surface of said collar being slightly smaller than the inner surface of said cylinder, and the inner surface of the outer wall of the housing being slightly larger than the outer surface of said cylinder so as to provide a small amount of play to allow slight flow of lubricating and damping fluid.

3. A spindle bearing according to claim 1 and in which the fluid flow damping means comprises a plurality of hollow cylinders of a size to leave slight space for fluid flow therebetween.

4. A spindle bearing according to claim 1 and in which the fluid flow damping means comprises a spirally coiled strip.

WERNER NAEGELI.

REFERENCES CITED

The following references are of record in the file of this patent:

UNITED STATES PATENTS

| Number | Name | Date |
|---|---|---|
| 300,462 | Gray | June 17, 1884 |
| 408,165 | Draper | July 30, 1889 |
| 475,994 | Woodmancy | May 31, 1892 |
| 644,572 | Bergman | Mar. 6, 1900 |
| 2,025,787 | Stahlecker | Dec. 31, 1935 |
| 2,285,681 | Rushing | June 9, 1942 |

FOREIGN PATENTS

| Number | Country | Date |
|---|---|---|
| 19,871 | Great Britain | 1912 |